Sept. 29, 1931. M. LOUGHEAD 1,825,005
MEANS FOR ATTACHING FITTINGS TO THE ENDS OF HIGH PRESSURE HOSE
Filed July 10, 1925
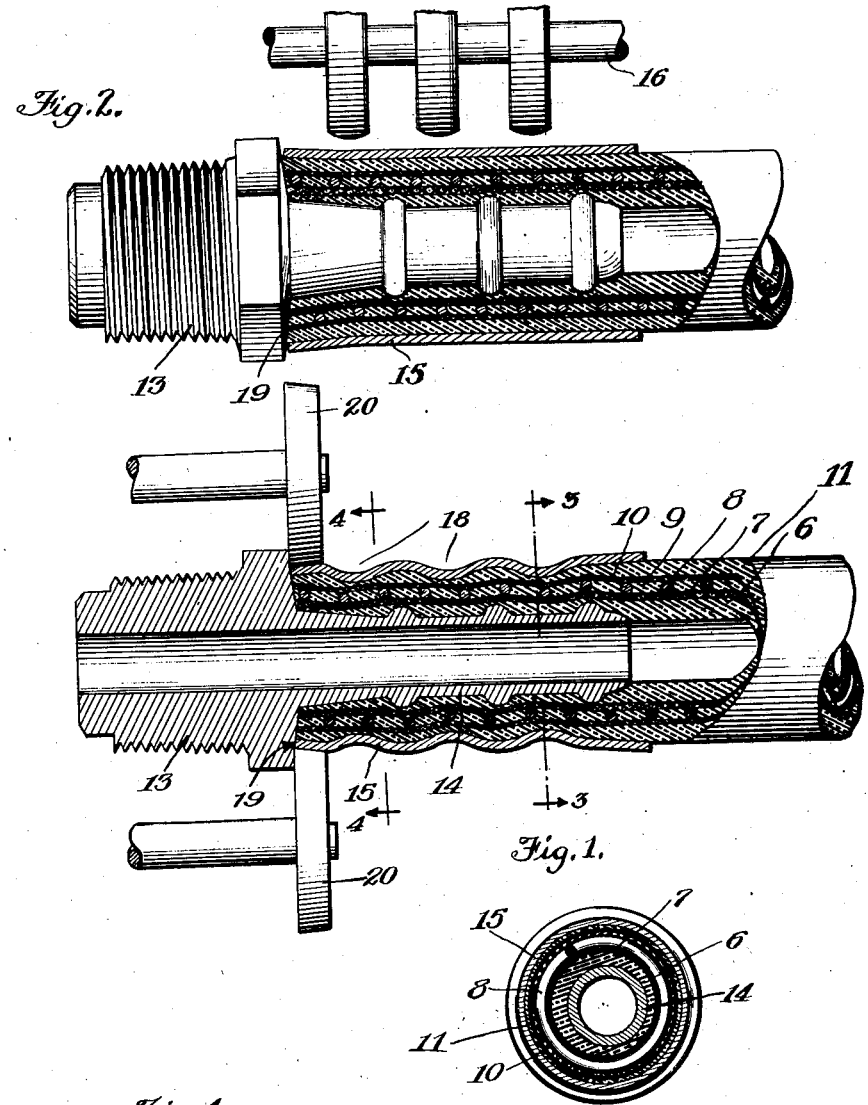
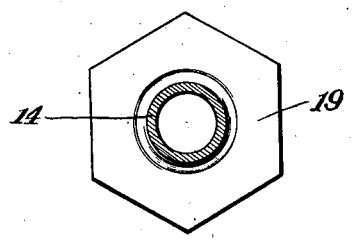
Inventor
Malcolm Loughead.
By Williams, Bradbury,
McCaleb + Hinkle
Attys.

Patented Sept. 29, 1931

1,825,005

UNITED STATES PATENT OFFICE

MALCOLM LOUGHEAD, OF DETROIT, MICHIGAN, ASSIGNOR TO HYDRAULIC BRAKE COMPANY, OF LOS ANGELES, CALIFORNIA, A CORPORATION OF CALIFORNIA

MEANS FOR ATTACHING FITTINGS TO THE ENDS OF HIGH PRESSURE HOSE

Application filed July 10, 1925. Serial No. 42,849.

This invention relates to a means for attaching fittings to the ends of high pressure hose. The object of the invention is to provide an inexpensive means for attaching the hose fitting which means has sufficient strength to withstand the shock or strain caused by a severe pull upon the hose in a direction at an angle to the axis of the fitting.

My invention is illustrated in the accompanying drawings in which

Figure 1 is a section through a fitting and through that portion of a high pressure hose which connects with the fitting;

Figure 2 is a longitudinal section through the hose and the shell of the fitting as it would appear prior to the crimping of the fitting shell around the hose;

Figure 3 is a cross section through the hose and fitting taken on the line 3—3 of Figure 1, illustrating the eccentricities of the hose layers and the thimble of the fitting;

Figure 4 is a section through the thimble of the fitting taken on the line 4—4 of Figure 1.

It is to be understood that various forms of high pressure hose may be provided with the coupling of my invention but in the specific illustration I have shown a hose provided with an inner layer of rubber 6, next a layer of fabric 7, next a wire 8, imbedded in rubber 9, next a layer of fabric 10, and lastly, an outer layer of rubber 11. Much difficulty is experienced in attaching high pressure hose to coupling members in a manner which will prevent the hose from being pulled off the coupling member under extremely high pressure and in a manner which will effectively prevent leakage between the hose and the coupling member when high pressure is applied to the hose. In accordance with my present invention the coupling member comprises a portion 13 here illustrated as threaded for connection with a support or with another length of hose, said portion having an integral thimble 14 extending therefrom and adapted to be forced into the interior of the hose. A cylindrical sleeve 15 (Fig. 2) having been first slipped over the hose and having been moved to the position shown in Figure 2 after the thimble 14 has been inserted in the hose is crimped by means of a suitable set of rollers diagrammatically illustrated at 16 to compress the rubber, fabric and wire of the hose firmly between the circumferential corrugations 18 formed on the thimble 14. After the sleeve 15 has been thus crimped the end of the sleeve adjacent the sloping shoulder 19, is crimped inwardly by suitable means here illustrated as a roller 20, the slope of the shoulder 19 being such as to cause a high pressure to be created between the end of the sleeve and the wall 19 after the crimping operation has been performed.

This construction has marked advantages over a construction in which for example the sleeve 15 is made an integral part of the coupling member not only because of the decreased cost of manufacture, but primarily because of the fact that commercially made rubber hose can seldom be secured in which the central opening is exactly concentric with the outer circumference. The coupling member which I employ permits of a lack of concentricity as above explained and without danger that the pressure created on the thick side of the hose will be so great as to rupture the fabric and without danger that the pressure on the thin side of the hose will not be sufficient to prevent leakage. On my compression hose wherein it is important to maintain the opening through the coupling of a diameter not much less than the diameter of the inside of the hose, it is impracticable to make the thimble of sufficient thickness that it alone will have the necessary mechanical strength for preventing the breaking off of the thimble from the body of the coupling under side strain delivered to the coupling by pulls on the hose, but by the abutment of the end of the sleeve 15 against the shoulder 19 under the high pressure obtained by my construction, considerable strength and resistance to angular strains is added to the structure. It is to be understood that the contracting operation, particularly that performed by the roller 20, may be formed by other means, such for example as a crimping tool which applies pressure to the sleeve at a plurality of spaced points about the circumference of the sleeve adjacent the shoulder 19 so as to circumferentially corrugate the sleeve at this point and thus bring it in firm contact with the shoulder 19.

I claim:

A hose coupling comprising, a thimble having an enlarged attachment portion formed integral therewith, said attachment portion having a sloping shoulder adjacent the thimble, the thimble being provided with a conical portion at its innermost end, and a sleeve extending beyond the end of the thimble and annularly contracted at intervals along its length, the innermost end of the sleeve being contracted into a cone shape, the wall of which slopes in a direction opposite to the underlying cone of the thimble.

In witness whereof, I hereunto subscribe my name this 3rd day of July, 1925.

MALCOLM LOUGHEAD.